May 19, 1936.    R. J. PARSONS ET AL    2,040,951
MOTOR RESISTANCE HEATER
Filed May 20, 1931    2 Sheets-Sheet 1

Inventors
Robert J. Parsons
John W. Conway
By their Attorney
E. M. Bentley

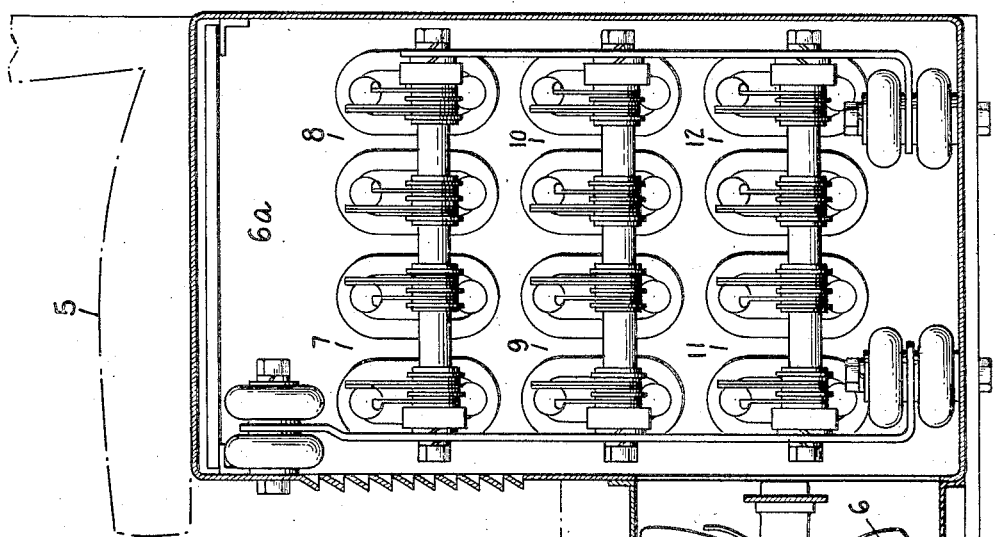
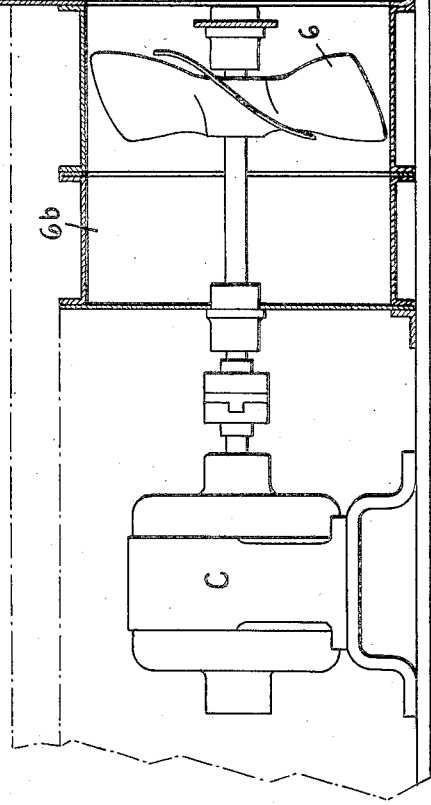
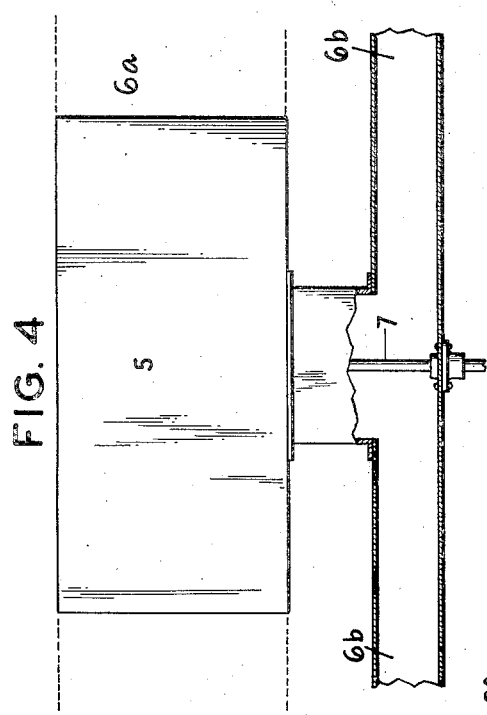

Patented May 19, 1936

2,040,951

UNITED STATES PATENT OFFICE 2,040,951

MOTOR RESISTANCE HEATER

Robert J. Parsons, Schenectady, and John W. Conway, Mechanicville, N. Y., assignors to Consolidated Car-Heating Company, Inc., Albany, N. Y., a corporation of New York Application May 20, 1931, Serial No. 538,814

6 Claims. (Cl. 219—20)

Figure 1:
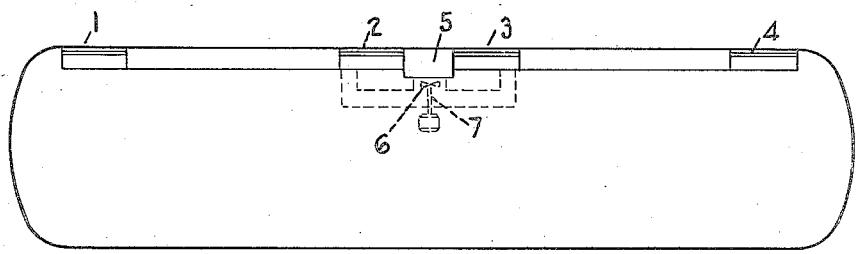
Figure 2:
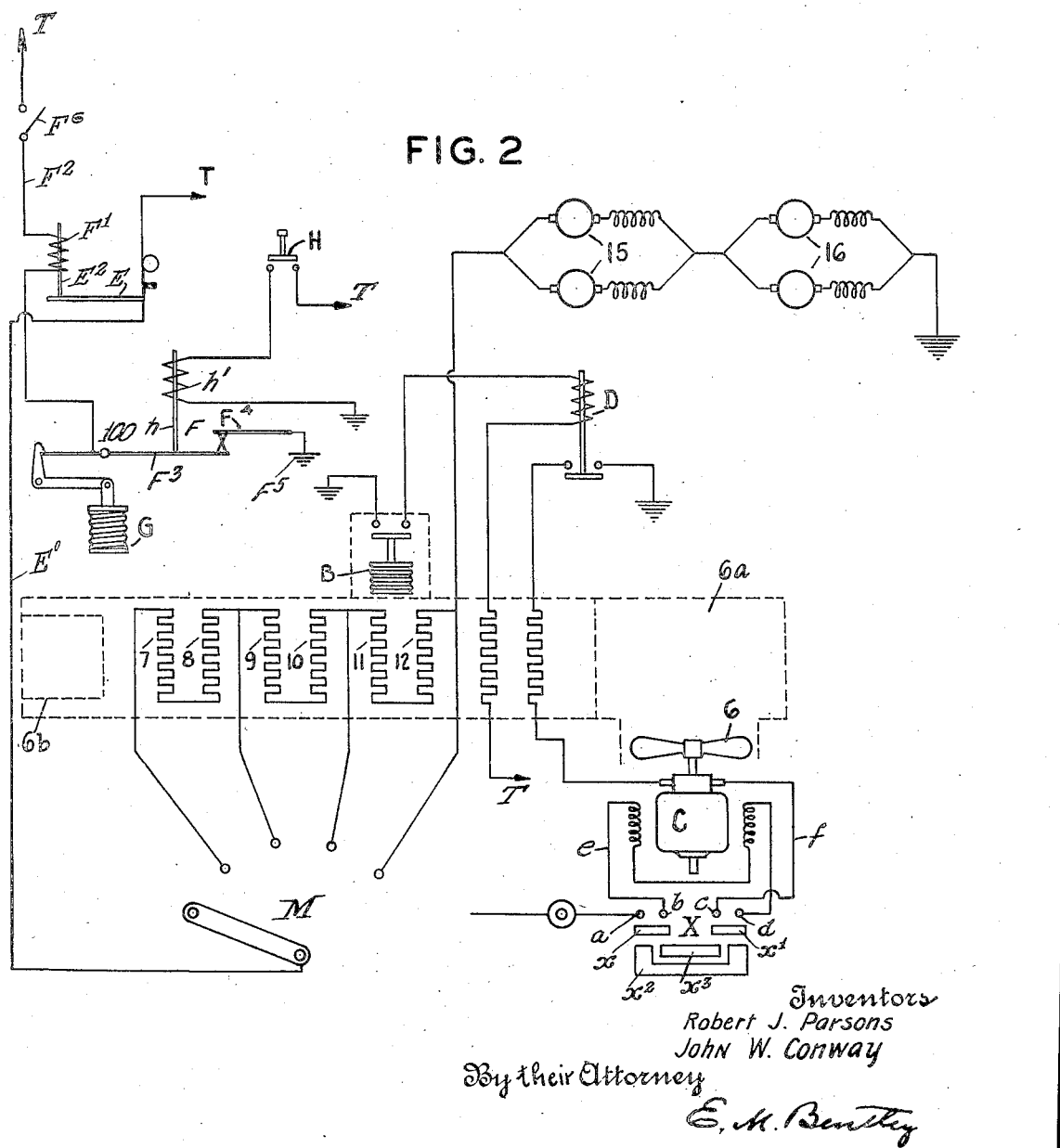

For a detailed description of the present form of our invention, reference may be had to the following specification and to the accompanying drawings forming a part thereof, wherein Fig. 1 represents a floor plan view of a car. Fig. 2 is a diagram illustrating the circuits as arranged according to our invention. Fig. 3 shows the resistance and fan. Fig. 4 illustrates the lower part of the car seat and below the car floor.

Referring more particularly to Figure 1, there are indicated four doors, 1, 2, 3 and 4, on one side, it being understood that the opposite side may also be provided with a like number of doors, if so desired. Between the two centre doors 2 and 3 a seat 5 is placed, within the car, and the heater duct underneath the car, through which the air is driven, terminates in a panel in front of the said seat 5. The fan 6, on shaft 7, which propels the air into (or out of) the car is indicated in Figs. 1 and 3 as located in front of the said panel and below the car floor under seat 5. Other arrangements consistent with the heating system hereinafter described may be adopted.

In the diagrammatic view, (Fig. 2) the arrow points on the extremities of various lines, and marked "T" indicate connections with a trunk line (not shown) connected with the usual trolley.

Our invention relates to a car system wherein the resistors that serve for the regulation of the motors are also used for heating the vehicle which the motors propel.

These resistor units we arrange in a duct under the car which at one end opens upwardly into the body of the car. At a convenient point in said duct, we place a reversible fan which, in one direction of rotation, forces the air along said duct, which air, after being heated by contact with the resistance units therein, passes up into the car to give warmth to it: while, for the opposite direction, this fan draws the air out of the car into the said duct and forces it out of the duct into the atmosphere for purposes of ventilation. The action of this fan is determined by the car temperature, while its direction of rotation is controlled by a hand switch. We also intend this fan to operate, in its car-heating cycle, after the resistors have reached a certain temperature. Up to that temperature the resistances merely serve for motor regulation and not for heating.

The motors, four in number, are shown in Fig. 2 in two groups at 15 and 16, there being two motors in each group. The motor-rheostat coils, 7, 8, 9, 10, 11, 12, are also shown in Fig. 2, while in Fig. 3 they are indicated in position under the seat 5 which extend between the doors 2 and 3 in Fig. 1. The connections of the motors for purposes of regulation are no part of our present invention. Said motors are here shown in one multiple-series arrangement and in series with the aforesaid resistances 7–12 which are themselves in series. It will be understood, however, that for motor-regulation purposes both the motors and the resistances may be connected up in different ways to give different degrees of power and speed to the vehicles. For purposes of illustration, the resistances 7 to 12, both inclusive, are shown as respectively connected by leads with the usual controller switch M. The aforesaid resistances are indicated in Fig. 2 as contained in a duct under the seat which, at a point $6^a$ is enlarged to form a heating chamber under the centre seat 5 and at $6^b$ may also open upward into the body of the car. The distinction between the motor-regulating function of these resistances and their function as car-heaters is indicated by the thermostat B, Fig. 2, which, below a certain temperature point of said resistances, allows them to serve as controlling resistances for the propelling motors 15 and 16, but above that temperature converts them into heaters by starting the blower motor C which directs a blast of air over them and up into the car above. Thus the said thermostat B, at the critical resistance temperature aforesaid, closes the circuit of a magnet D (Fig. 2) which acts to close the circuit of the aforesaid blower motor C. In this manner the said resistances only serve as heaters when their temperature is above a specified degree. The fan motor C is controlled by a suitable reversing switch X, which is illustrated by conventional diagram. In one position of the switch the current flows from the trolley T by way of contacts $a$, $x$ and $b$, field wire $e$, contacts $c$, $x'$, $d$, and wire $f$, to the motor armature and then to ground. In the reverse position of the switch, current will flow from the trolley T by way of contacts $a$, $x^2$ and $d$, and reversely through the field wire $e$ to contacts $b$, $x^3$ and $c$, and wire $f$, to the motor armature and to ground. Thus, the current may be reversed through the fields but travels in the same direction through the armature. By this arrangement, the fan may be selectively employed for the heating or ventilating functions heretofore referred to. The rheostat coils 7 to 12, both inclusive, are shown as under the control of a line breaker switch E, which is connected with said coils and the motors by the conductor E', through the usual controller M, as shown in Figure 2. Said line breaker switch is provided with a core E², which is complemental to an electro-magnetic coil F'' in the circuit F² of a circuit breaker F, the movable contact F³ of which is pivoted at 100, and the fixed contact F⁴ grounded at F⁵. The circuit F² preferably includes a manual switch F⁶. The movable contact F³ of the circuit breaker is normally held in closed position by a thermostat G which, upon expansion due to any cause, such for instance as overheating of the coils, will release the contact F³ and break the circuit through the coil F⁴, thereby releasing the core E² and breaking the circuit to the rheostat coils and the motor switch by opening movement of the line breaker switch E. The contact F³ has a core $h$ complemental to a coil $h'$ in a circuit connected with the trolley T through a manual reset switch H. By this arrangement, the circuit through the circuit breaker F may be restored if desired or necessary.

What we claim as new and desire to secure by Letters Patent is:

1. In a car heating system, a motor circuit including motor rheostat coils, a fan so positioned as to direct a current of air over said coils, a circuit for the fan motor independent of the first mentioned motor circuit, a switch in the fan motor circuit, and thermally responsive means controlling said fan motor circuit, said last mentioned means including a thermostat located adjacent the rheostat coils and so constructed as to be responsive to a predetermined temperature produced by the rheostat coils while in operation.

2. In a car heating system, a motor circuit including motor rheostat coils, a fan circuit independent of the motor circuit and including a fan so positioned as to direct a current of air over said coils, and a thermostatically controlled circuit including an electromagnetic switch controlling the fan circuit, said thermostatically controlled circuit being constructed and arranged to close the fan circuit if the temperature of the rheostat coils rises to a predetermined degree, the motor circuit being so constructed and arranged as to be unaffected by the operation of said fan circuit.

3. An electric heater system comprising a motor circuit provided with a series of motor regulating resistances, a blower so positioned as to direct an air current over said resistances, a circuit for said blower independent of the motor circuit, an electro-magnetic switch controlling the blower circuit, a low temperature thermostat so constructed and arranged as to control said electromagnetic switch, so as to start and stop the fan while the resistances are energized, said thermostat being positioned adjacent said resistances so as to be influenced by the temperature thereof, the parts being so constructed and arranged as to maintain the action of the blower while the temperature of the resistances exceeds a predetermined degree and without interrupting current flow through said resistances.

4. An electric heater system comprising a motor circuit provided with a series of motor regulating resistances, a blower so positioned as to direct an air current over said resistances, a circuit breaker controlling the motor circuit, a high temperature thermostat located adjacent said resistances and so positioned as to be influenced by the temperature thereof, said thermostat being so constructed and arranged as to control said circuit breaker, and temperature responsive means controlling said blower and including a control element so positioned as to be responsive to the temperature of said resistances, the parts being so constructed and arranged as to maintain the action of the blower while the temperature of the resistances exceeds a predetermined degree and without interrupting current flow through the resistances.

5. In a car heating system, a motor circuit including motor rheostat coils, a fan so positioned as to direct an air current over said coils in either of two directions, a circuit for the fan independent of said rheostat coils, a switch controlling the fan circuit, a circuit controlling the last-mentioned switch, said last-mentioned circuit including a thermostat located adjacent said rheostat coils and so constructed and arranged as to be responsive to a predetermined temperature produced by said coils while in operation, and means for reversing the rotation of the fan.

6. In a car heating system, a motor circuit including motor rheostat coils, a fan so positioned as to direct a current of air over said coils in either of two directions, a motor for said fan including field coils and an armature, a reversing switch for said fan motor so connected with the field and armature thereof that current flows through the armature in a fixed direction irrespective of the direction of current flow through the field motor, and temperature responsive means controlling the flow of current to the fan motor, said last mentioned means including a thermostat positioned adjacent to the rheostat coils and so constructed as to be responsive to a predetermined temperature produced by said coils while in operation.

ROBERT J. PARSONS.
JOHN W. CONWAY.